United States Patent
Kim et al.

(10) Patent No.: US 9,664,842 B2
(45) Date of Patent: May 30, 2017

(54) LIGHT SOURCE MODULE AND BACKLIGHT UNIT HAVING THE SAME

(71) Applicant: SAMSUNG ELECTRONICS CO., LTD., Suwon-si, Gyeonggi-do (KR)

(72) Inventors: Young Kyung Kim, Suwon-si (KR); Seog Ho Lim, Seongnam-si (KR); Ji Hyun Lim, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 113 days.

(21) Appl. No.: 14/716,701

(22) Filed: May 19, 2015

(65) Prior Publication Data

US 2016/0062033 A1 Mar. 3, 2016

(30) Foreign Application Priority Data

Sep. 3, 2014 (KR) .................. 10-2014-0116978

(51) Int. Cl.
*F21V 7/04* (2006.01)
*F21V 8/00* (2006.01)

(52) U.S. Cl.
CPC .......... *G02B 6/0085* (2013.01); *G02B 6/009* (2013.01); *G02B 6/0053* (2013.01); *G02B 6/0055* (2013.01); *G02B 6/0068* (2013.01); *G02B 6/0083* (2013.01); *G02B 6/0091* (2013.01)

(58) Field of Classification Search
CPC .. G02B 6/0085; G02B 6/0053; G02B 6/0055; G02B 6/0068; G02B 6/0083; G02B 6/009; G02B 6/0091

USPC ....... 362/606, 613, 630, 631, 632, 633, 634, 362/97.1, 97.2, 97.3
See application file for complete search history.

(56) References Cited

U.S. PATENT DOCUMENTS

| 5,838,412 A | 11/1998 | Ueda et al. |
|---|---|---|
| 6,372,608 B1 | 4/2002 | Shimoda et al. |
| 6,645,830 B2 | 11/2003 | Shimoda et al. |
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |

(Continued)

FOREIGN PATENT DOCUMENTS

| KR | 20130020171 A | * | 2/2013 |
|---|---|---|---|
| KR | 20130027875 A | * | 3/2013 |

(Continued)

OTHER PUBLICATIONS

Machine English Translation of KR20130020171A Feb. 2013.*
Machine English Translation of KR20130027875A Mar. 2013.*
Machine English Translation of KR101435451 Aug. 2014.*

*Primary Examiner* — Anh Mai
*Assistant Examiner* — Glenn Zimmerman
(74) *Attorney, Agent, or Firm* — Muir Patent Law, PLLC

(57) ABSTRACT

A light source module is provided. The light source module includes a substrate having a first surface on which a circuit portion is disposed, and a second surface disposed opposite thereto. The light source module further includes a plurality of light emitting devices mounted on the first surface of the substrate and electrically connected to the circuit portion, wherein the substrate is provided with a groove portion in the second surface thereof, and has a structure bent along the groove portion.

20 Claims, 14 Drawing Sheets

(56) References Cited

U.S. PATENT DOCUMENTS

| | | | |
|---|---|---|---|
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |
| 7,319,044 B2 | 1/2008 | Han et al. |
| 7,501,656 B2 | 3/2009 | Han et al. |
| 7,597,468 B2 | 10/2009 | Weng et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,071,882 B2 | 12/2011 | Okajima et al. |
| 8,115,370 B2 | 2/2012 | Huang |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,338,197 B2 | 12/2012 | Bisberg |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 | 9/2013 | Kwak et al. |
| 8,558,255 B2 | 10/2013 | Bisberg |
| 8,648,359 B2 | 2/2014 | Hussell et al. |
| 8,686,445 B1 | 4/2014 | Hussell et al. |
| 8,735,931 B2 | 5/2014 | Han et al. |
| 8,766,295 B2 | 7/2014 | Kim |
| 2010/0208159 A1* | 8/2010 | Oan ............ G02B 6/0091 349/58 |
| 2010/0220472 A1 | 9/2010 | Dahm |
| 2010/0290248 A1* | 11/2010 | Park ............ G02B 6/0091 362/606 |
| 2011/0199787 A1 | 8/2011 | Kim et al. |
| 2012/0300491 A1 | 11/2012 | Hussell et al. |
| 2013/0077348 A1 | 3/2013 | Byun et al. |
| 2013/0206459 A1* | 8/2013 | Park ............ H01L 25/0753 174/252 |
| 2013/0223069 A1 | 8/2013 | Kim |
| 2015/0092446 A1* | 4/2015 | Park ............ F21V 21/14 362/613 |
| 2015/0289358 A1* | 10/2015 | Park ............ G02B 6/0085 349/65 |

FOREIGN PATENT DOCUMENTS

| | | | | |
|---|---|---|---|---|
| KR | WO 2013094950 A1 * | 6/2013 | ......... | G02B 6/0085 |
| KR | 20130073471 A * | 7/2013 | | |
| KR | 101435451 B1 * | 8/2014 | | |

* cited by examiner

LIGHT SOURCE MODULE AND BACKLIGHT UNIT HAVING THE SAME

CROSS-REFERENCE TO RELATED APPLICATION

This application claims the priority and benefit of Korean Patent Application No. 10-2014-0116978 filed on Sep. 3, 2014, with the Korean Intellectual Property Office, the disclosure of which is incorporated herein by reference.

BACKGROUND

The present disclosure relates to a light source module and a backlight unit having the same.

Backlight units are classified as edge-type backlight units, that is, side view-type backlight units, and direct-type backlight units, that is, top view type backlight units. Such edge-type backlight units are designed such that a bar-shaped linear light source is disposed on a lateral surface of a liquid crystal display (LCD) panel to emit light therethrough via a light guide panel. On the other hand, direct-type backlight units emit light directly through LCD panels from a surface light source disposed therebelow.

In the case of an edge-type backlight unit capable of being slimmed, as compared to direct-type backlight units, a lead frame is provided at a lateral surface of a light emitting device package so as to be mounted on a substrate in order to provide a side-view type backlight unit. Accordingly, heat generated by the light emitting device package may be transferred to the substrate through the lateral surface thereof, and thus edge-type backlight units may be relatively inefficient in terms of heat dissipation. Also, due to a relatively small mounting area in the edge-type backlight units, the light emitting device package may be easily separated therefrom, and thereby structural instability may be caused in the edge-type backlight units.

SUMMARY

An aspect of the present disclosure may provide a solution to improve heat dissipation efficiency of a backlight unit as well as enhance reliability through the use of a stable mounting structure thereof.

According to an aspect of the present disclosure, a light source module may include a substrate including a first surface on which a circuit portion is disposed, and a second surface disposed opposite thereto; and a plurality of light emitting devices mounted on the first surface, and electrically connected to the circuit portion, wherein the substrate is provided with a groove portion in the second surface thereof, and has a structure bent along the groove portion.

The groove portion may extend in a lengthwise direction of the substrate to be parallel to both sides of the substrate in a widthwise direction.

The substrate may be divided into a first area and a second area, based on the groove portion, and may have a structure bent towards the first surface of the substrate based on the groove portion, such that the first area may be perpendicular to the second area.

One of the first area and the second area may be larger than the other.

The plurality of light emitting devices may be disposed on the substrate in the lengthwise direction thereof.

The circuit portion may include a plurality of first electrode pads and a plurality of second electrode pads disposed on the substrate in the lengthwise direction thereof to be disposed adjacently to a side of the substrate in the widthwise direction thereof, and a pair of circuit wirings having one ends connected to the first electrode pad and the second electrode pad, respectively, and the other ends connected to connectors, respectively.

The plurality of first electrode pads and the plurality of second electrode pads may be disposed on the substrate in the lengthwise direction thereof in an alternating manner while being spaced apart from one another at predetermined intervals.

The substrate may have a laminate structure including a metal layer, an insulating layer covering the metal layer, and a copper clad layer forming the circuit portion.

The light source module may further include a protrusion portion protruding from the first surface of the substrate while being adjacent to the plurality of light emitting devices.

The protrusion portion protruding from the first surface of the substrate may protrude further than the plurality of light emitting devices.

According to another aspect of the present disclosure, a backlight unit may include a light source module including a substrate including a first surface on which a circuit portion is disposed, and a second surface disposed opposite thereto; and a plurality of light emitting devices mounted on the first surface, and electrically connected to the circuit portion, wherein the substrate is provided with a groove portion in the second surface thereof, and has a structure bent along the groove portion; a light guide panel to which light of the light source module enters to be dissipated externally; and a housing on which the light source module and the light guide panel are mounted.

The first surface of the substrate of the light source module may include a first area and a second area. The plurality of light emitting devices may be mounted on the first area of the first surface. The substrate and the light guide panel may be positioned such that the first area faces a lateral surface of the light guide panel to allow the plurality of light emitting devices to face the lateral surface of the light guide panel, and the second area faces a bottom surface of the light guide panel.

The housing may have a bottom surface and a sidewall connected to a circumference of the bottom surface, and the second surface of the substrate of the light source module may include a first area and a second area. The first area of the second surface of the substrate may be in contact with the sidewall, and the second area of the second surface of the substrate may be in contact with the bottom surface of housing.

Heat generated from the plurality of light emitting devices may be transferred to the bottom surface of housing through the second area of the second surface of the substrate which is in contact with the bottom surface of housing.

The light source module may further include a protrusion portion protruding from the first surface of the substrate while being adjacent to the plurality of light emitting devices, wherein an end of the protrusion portion is in contact with a light incident surface of the light guide panel.

The light incident surface of the light guide panel may be a lateral surface of the light guide panel facing the plurality of light emitting devices.

The light of the light source module may travel to an interior of the light guide panel through the lateral surface of the light guide panel, and a top surface of the light guide panel may be a light exit surface through which the light of the light source module externally dissipates.

The protrusion portion protruding from the first surface of the substrate may protrude further than the plurality of light emitting devices to prevent a contact between the light guide panel and the plurality of light emitting devices.

The protrusion portion may function as a reflective surface obscuring upper portions of the plurality of light emitting devices.

The backlight unit may further include a connector connected to the light source module to supply driving power thereto.

The light guide panel may include a reflective sheet below a bottom surface thereof and an optical sheet on a top surface thereof. The reflective sheet may reflect light from the plurality of light emitting devices on an interior of the light guide panel towards the top surface of the light guide panel, and the optical sheet may converge the light inwardly of a front viewing angle, to enhance luminance of a display device in which the backlight unit is installed.

BRIEF DESCRIPTION OF DRAWINGS

The above and other aspects, features and advantages of the present disclosure will be more clearly understood from the following detailed description taken in conjunction with the accompanying drawings.

DETAILED DESCRIPTION

Figure 1:
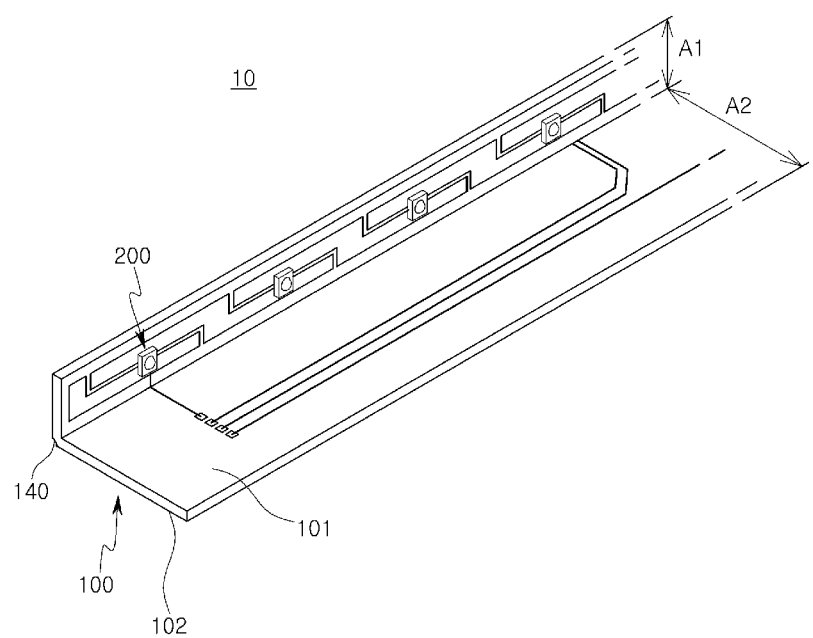
FIG. 1 is a perspective view schematically illustrating a light source module according to an exemplary embodiment in the present disclosure.

Exemplary embodiments in the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In the present specification, terms such as "top," "upper portion," "top surface," "below," "lower portion," "lower surface," "side," "lateral surface," and the like, are determined based on the drawings, and in actuality, the terms may be changed according to a direction in which a device or a constituent is disposed.

Hereinafter, a light source module according to an exemplary embodiment in the present disclosure will be described with reference to FIGS. 1 and 2. FIG. 1 is a perspective view schematically illustrating a light source module according to an exemplary embodiment in the present disclosure, and FIG. 2 is a cross-sectional view of FIG. 1.

Figure 2:
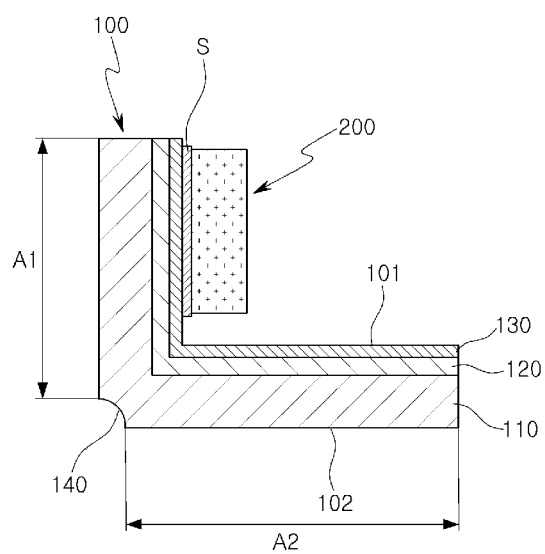
FIG. 2 is a cross-sectional view of FIG. 1.

Referring to FIGS. 1 and 2, a light source module 10 according to an exemplary embodiment in the present disclosure may include a substrate 100 and a plurality of light emitting devices 200 mounted on the substrate 100.

The substrate 100 may have a first surface 101 and a second surface 102 disposed opposite thereto, and have an "L"-shaped bent structure overall. For example, the substrate 100 may have a pair of sides in parallel in a widthwise direction thereof and a pair of ends in parallel in a lengthwise direction thereof, and may have an "L"-shaped cross section in the widthwise direction thereof.

The first surface 101 may define a top surface of the substrate 100, and the second surface 102 may define a bottom surface of the substrate 100.

As illustrated in FIG. 2, the substrate 100 may have a laminate structure including a metal layer 110, an insulating layer 120 covering the metal layer 110, and a circuit portion 130 provided on the insulating layer 120. For example, the substrate 100 may include a metal copper clad laminate (MCCL).

Figure 10:
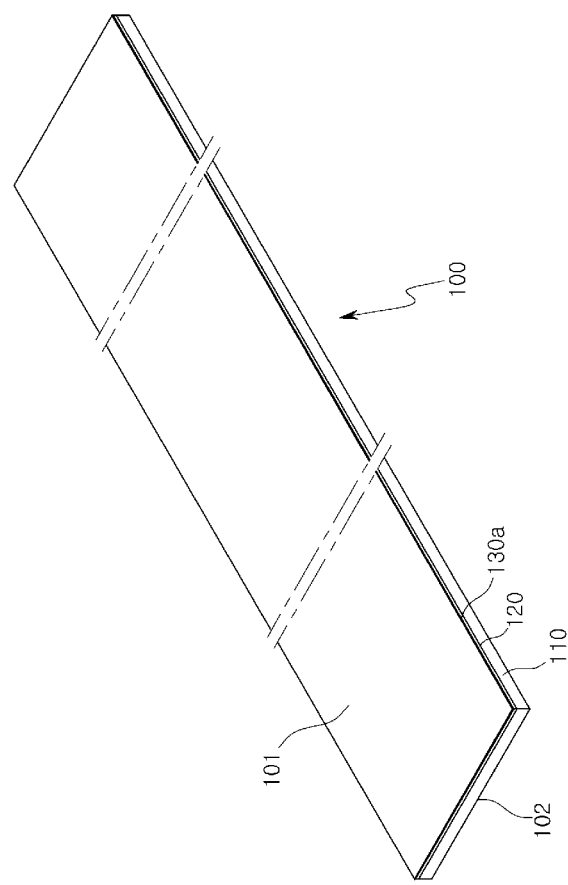
FIGS. 10 through 13 are diagrams schematically illustrating sequential operations in a method of manufacturing a light source module according to an exemplary embodiment in the present disclosure.
Figure 11:
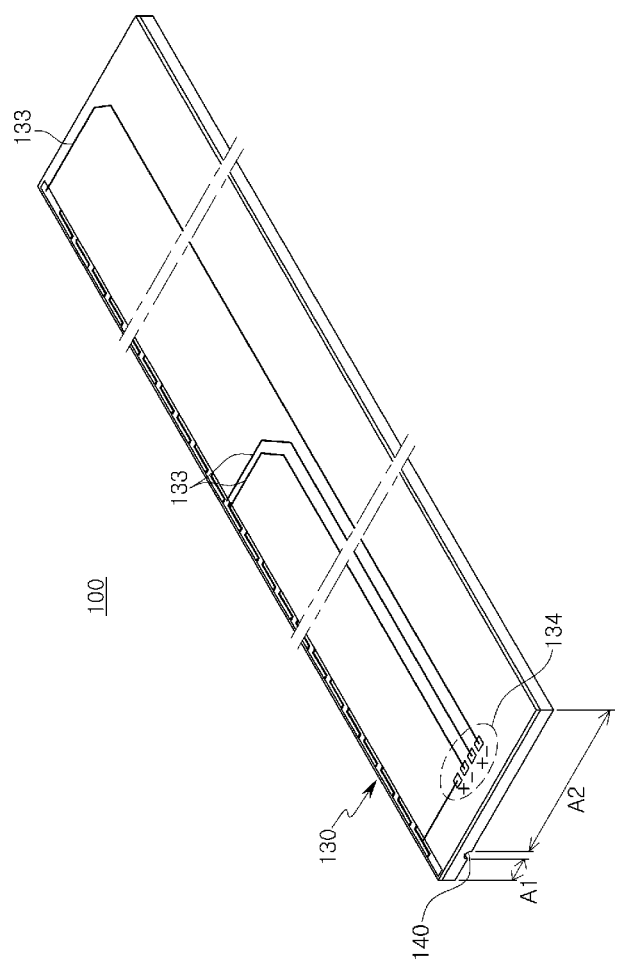

The metal layer 110 may be formed of a metal having relatively high thermal conductivity. For example, the metal may include a copper (Cu) plate or an aluminum (Al) plate. The insulating layer 120 may be formed of a polypropylene (PP) or polyimide (PI) based resin by way of example. The circuit portion 130 may be formed by patterning a copper clad layer 130a stacked on the insulating layer 120 as illustrated in FIGS. 10 and 11.

The second surface 102 may be provided with a groove portion 140 formed therein, recessed to a predetermined depth in the second surface 102 in a direction towards the first surface 101. The groove portion 140 may have a structure extending in the lengthwise direction of the substrate 100 to be parallel to both sides of the substrate 100 in the widthwise direction. The groove portion 140 may be provided adjacently to one of the sides of the substrate 100 in the widthwise direction.

For example, the groove portion 140 may be formed on the second surface 102 by etching. However, the process of the second surface 102 for forming the groove portion 140 is not limited thereto, and a physical process, such as punching, may be used.

The substrate 100 may be divided into a first area A1 and a second area A2 by the groove portion 140. The first area A1 and the second area A2 may be divided based on the widthwise direction of the substrate 100, and one of the first area A1 and the second area A2 may be larger than the other.

According to the exemplary embodiment, the first area A1 may be smaller than the second area A2; however, the sizes of the areas A1 and A2 are not limited thereto. For example, the sizes of the first and second areas A1 and A2 may vary based on a position of the groove portion 140.

The substrate 100 may have a structure of which the first area A1 and the second area A2 are disposed on different planes.

As illustrated in FIGS. 1 and 2, a portion of the substrate 100 may be bent towards the first surface 101 based on the groove portion 140, such that the first area A1 may be perpendicular to the second area A2. That is, the groove portion 140 may correspond to a demarcation line, or a reference axis, in the bending of the substrate 100. Such a bent structure of which the first area A1 is perpendicular to the second area A2 may be obtained by bending the substrate 100 along the groove portion 140.

Figure 3:
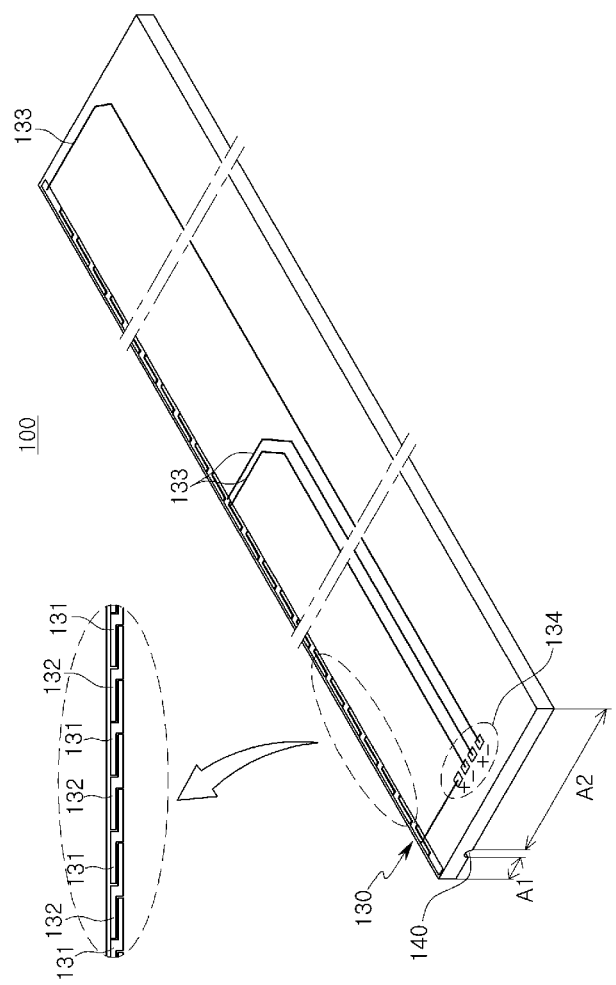
FIG. 3 is a perspective view schematically illustrating a state of a substrate provided in the light source module of FIG. 1.
Figure 4:
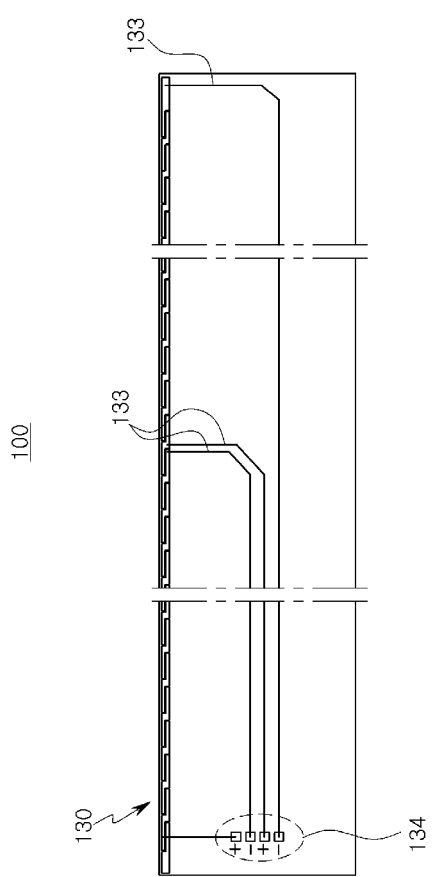
FIG. 4 is a plan view of FIG. 3.

FIGS. 3 and 4 schematically illustrate a state of the substrate 100 prior to the bent structure being formed thereof. In other words, the substrate 100 may be bent in a state in which the first surface 101 and the second surface 102 are parallel to one another as illustrated in FIGS. 3 and 4 so as to have the bent structure as illustrated in FIGS. 1 and 2.

The first surface 101 may be provided with a circuit portion 130 thereon. The circuit portion 130 may include a plurality of first electrode pads 131, a plurality of second electrode pads 132, and a plurality of circuit wirings 133.

The plurality of first electrode pads 131 and the plurality of second electrode pads 132 may be disposed in the lengthwise direction of the substrate 100 in the first area A1 to be disposed adjacently to one side of the substrate 100 in the widthwise direction. The plurality of first electrode pads 131 and the plurality of second electrode pads 132 may be disposed on the substrate 100 in the lengthwise direction thereof in an alternating manner, while being spaced apart from one another at predetermined intervals. The plurality of first electrode pads 131 and the plurality of second electrode pads 132 may have forms corresponding to one another.

The circuit wirings 133 may be provided on the first surface 101 in addition to the plurality of first electrode pads 131 and the plurality of second electrode pads 132, and may connect the plurality of first electrode pads 131 and the plurality of second electrode pads 132 to connectors (not illustrated) provided for a connection to an external power source.

A pair of the circuit wirings 133 may have one ends connected to an outermost first electrode pad 131 and an outermost second electrode pad 132 disposed at both ends of an array of the plurality of first electrode pads 131 and the plurality of second electrode pads 132, respectively, and the other ends forming a connection area 134. The circuit wirings 133 may extend from the first area A1 in which the plurality of first electrode pads 131 and the plurality of second electrode pads 132 are disposed in a direction of the second area A2, and may be patterned in various forms.

According to the exemplary embodiment, the array of the plurality of first electrode pads 131 and second electrode pads 132 may be divided into two areas, and two pairs of circuit wirings 133 may be provided in respective areas, in which each pair of circuit wirings 133 is connected to the first electrode pad 131 and the second electrode pad 132 disposed at both ends of each area, respectively. However, the number of divided areas in the array is not limited thereto. For example, the array may be divided into three or more areas, and corresponding thereto, the circuit wirings 133 may be provided in three or more pairs.

Likewise, in a case in which the plurality of first electrode pads 131 and second electrode pads 132 are divided into a plurality of areas, an independent power source may be supplied to each divided area in order to facilitate partial driving thereto, that is local dimming.

The plurality of light emitting devices 200 may be mounted on the first surface 101 of the substrate 100, and may be electrically connected to the circuit portion 130.

As illustrated in FIGS. 1 and 2, each of the plurality of light emitting devices 200 may be mounted on the circuit portion 130 so as to be disposed in the lengthwise direction of the substrate 100. In detail, the plurality of light emitting devices 200 may be electrically connected to the plurality of first electrode pads 131 and second electrode pads 132 through a solder S, and may be disposed corresponding to the array thereof.

The plurality of light emitting devices 200 may be mounted on the smaller of the first area A1 and the second area A2. According to the exemplary embodiment, the plurality of light emitting devices 200 may be mounted on the first area A1; however, the mounting area of the light emitting devices 200 is not limited thereto.

The plurality of light emitting devices 200 may be a photoelectric device generating light having a predetermined wavelength through externally supplied driving power. For example, the plurality of light emitting devices 200 may include a semiconductor LED chip having an n-type semiconductor layer, a p-type semiconductor layer, and an active layer interposed therebetween, or a package including the semiconductor LED chip.

The plurality of light emitting devices 200 may emit blue light, green light, or red light depending on a material contained therein or through a combination thereof with a phosphor, or may emit white light, ultraviolet light, and the like.

Figure 5A:
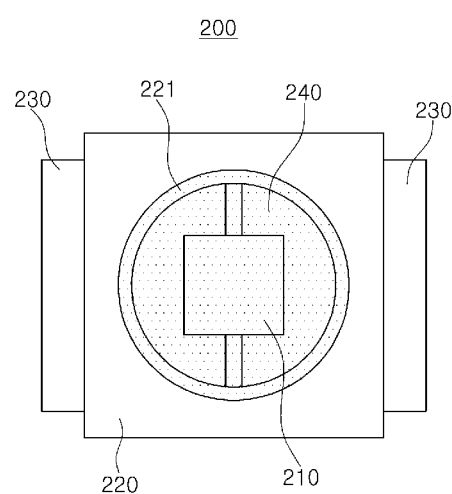
FIGS. 5A and 5B are a plan view and a cross-sectional view each schematically illustrating a light emitting device of the light source module of FIG. 1.
Figure 5B:
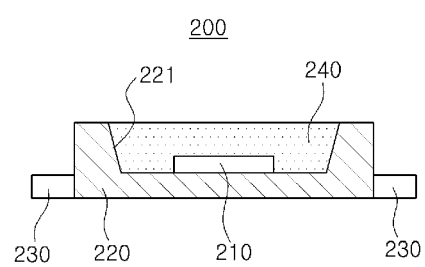

FIGS. 5A and 5B are a plan view and a cross-sectional view each schematically illustrating a light emitting device of the light source module of FIG. 1.

As illustrated in FIGS. 5A and 5B, the plurality of light emitting devices 200 may have a package structure in which an LED chip 210 is mounted in a body 220 including a reflective cup 221.

The body 220 may correspond to a base member in which the LED chip 210 is mounted and supported thereby, and may be formed of a white molding compound having relatively high light reflectivity. The white molding compound may reflect light emitted from the LED chip 210 to increase an amount of light dissipated externally. Such a white molding compound may include a thermosetting resin-based material or a silicon resin-based material having relatively high thermal resistance. Also, a white pigment, a filler, a curing agent, a release agent, an antioxidant, an adhesion-improving agent, and the like, may be added to the thermosetting resin-based material. Further, the body 220 may be formed of FR-4, CEM-3, an epoxy material, a ceramic material, or the like. In addition, the body 220 may be formed of a metal material such as aluminum (Al).

The body 220 may include a lead frame 230 to be electrically connected to an external power source. The lead frame 230 may be formed of a metal material having relatively high electric conductivity, for example, Al or Cu. In a case in which the body 220 is formed of a metal material, an insulating material may be interposed between the body 220 and the lead frame 230.

The lead frame 230 may be exposed to a bottom surface of the reflective cup 221 included in the body 220, in which the LED chip 210 is mounted on the bottom surface of the reflective cup 221. In addition, the LED chip 210 may be electrically connected to the exposed lead frame 230.

An area of an opening of the reflective cup 221 in the top surface of the body 220 may be larger than an area of the bottom surface of the reflective cup 221. Here, the opening of the reflective cup 221 in the top surface of the body 220 may define a light emitting surface of the light emitting device 200.

The LED chip 210 may be sealed by an encapsulating portion 240 formed in the reflective cup 221 of the body 220. The encapsulating portion 240 may contain a wavelength converting material.

For example, the wavelength converting material may contain at least one type of phosphor emitting light through being excited by light generated by the LED chip 210 so as to emit light having a wavelength different from the light generated by the LED chip 210. Accordingly, the emission of light may be controlled to have different colors including white light.

For example, in a case in which the LED chip 210 emits blue light, white light may be emitted through a combination thereof with yellow, green, and red, or orange phosphors. Also, the LED chip 210 may be configured to include at least one light emitting device emitting purple, blue, green, red, or infrared (IR) light. In this instance, the LED chip 210 may adjust a color rendering index (CRI) in a range from a level of light emitted by a sodium-vapor (Na) lamp with a CRI of 40, or the like, to a level of sunlight with a CRI of 100, and may generate various types of white light having a color temperature in a range of 2,000K to 20,000K. Also, the color may be adjusted by generating visible purple, blue, green, red, orange light, or IR light, corresponding to a surrounding atmosphere or desired mood as necessary. Also, light from within a predetermined wavelength known to stimulate plant growth may be generated.

Figure 7:
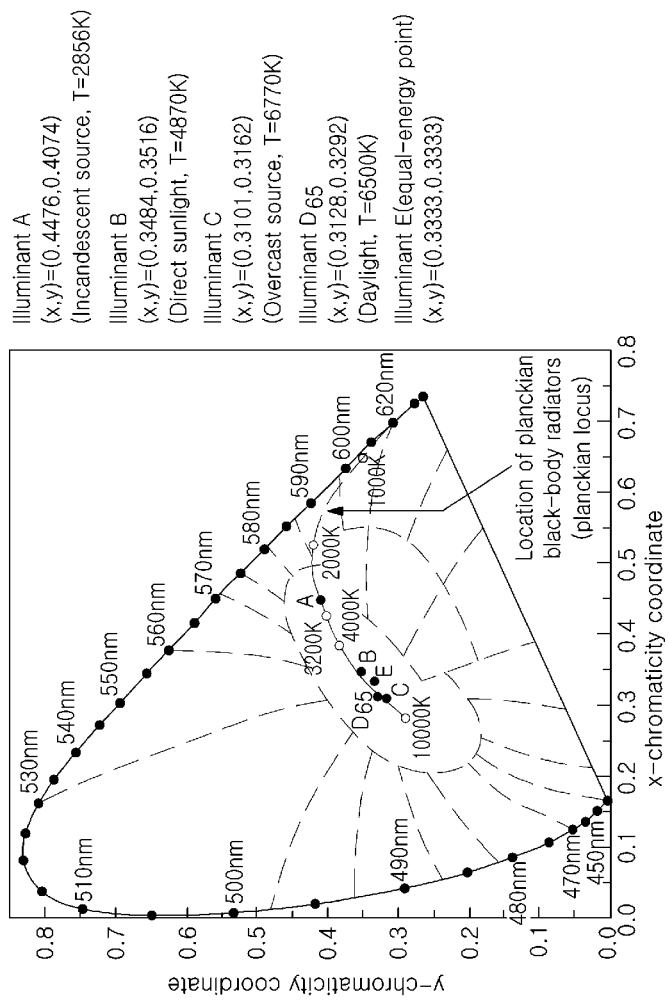
FIG. 7 is a CIE1931 coordinate system diagram.

White light generated by combining yellow, green, and red phosphors with a blue LED and/or combining at least one of a green LED and a red LED therewith may have two or more peak wavelengths, and may be positioned in a segment linking (x, y) coordinates of (0.4476, 0.4074), (0.3484, 0.3516), (0.3101, 0.3162), (0.3128, 0.3292), and (0.3333, 0.3333) in the CIE 1931 chromaticity diagram illustrated in FIG. 7. Alternatively, the white light may be positioned in a region surrounded by the segment and a black body radiation spectrum. The color temperature of the white light may be in a range of about 2,000K to 20,000K.

Phosphors may have empirical formulas and colors as follows.

Oxide-based phosphors: yellow and green $Y_3Al_5O_{12}$:Ce, $Tb_3Al_5O_{12}$:Ce, $Lu_3Al_5O_{12}$:Ce Silicate-based phosphors: yellow and green $(Ba,Sr)_2SiO_4$: Eu, yellow and orange $(Ba,Sr)_3SiO_5$:Ce Nitride-based phosphors: green β-SiAlON:Eu, yellow $La_3Si_6N_{11}$:Ce, orange α-SiAlON:Eu, red $CaAlSiN^3$:Eu, $Sr_2Si_5N_8$:Eu, $SrSiAl_4N_7$:Eu Fluoride-Based Phosphors: KSF Red $K_2SiF_6$:Mn4+

In general, phosphor compositions need to conform to Stoichiometric requirements, and each element may be substituted with a different element within the same group in the periodic table of elements. For example, strontium (Sr) may be substituted with barium (Ba), calcium (Ca), magnesium (Mg), or the like, in the alkaline earth metal group II while yttrium (Y) may be substituted with terbium (Tb), lutetium (Lu), scandium (Sc), gadolinium (Gd), or the like, in the lanthanide group. Also, europium (Eu), or the like, an activator, may be substituted with cerium (Ce), Tb, praseodymium (Pr), erbium (Er), ytterbium (Yb), or the like, based on a desired energy level. In addition, the activator may be used alone, or a co-activator, or the like, may be further included to change characteristics.

Further, a material such as a quantum dot (QD) may be used as a phosphor substitute material, or the phosphor and the QD may be used in combination or alone.

The QD may have a structure including a core such as cadmium selenide (CdSe) and indium phosphide (InP) having a diameter of 3 to 10 nanometers (nm), a shell such as zinc sulfide (ZnS) and zinc selenide (ZnSe) having a thickness of 0.5 to 2 nm, and a ligand for stabilizing the core and the shell, and may provide various colors based on the size thereof.

Figure 6A:
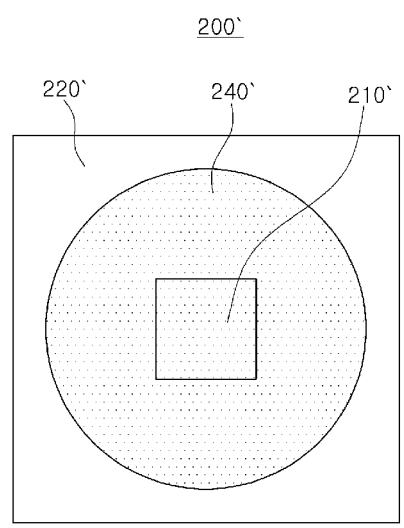
FIGS. 6A and 6B are a plan view and a cross-sectional view each schematically illustrating a modified example of the light emitting device of FIG. 5.
Figure 6B:
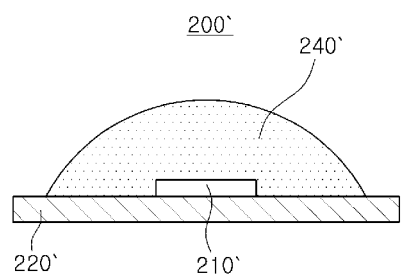

In this exemplary embodiment, the light emitting device 200 is illustrated as having a package structure in which the LED chip 210 is included in the body 220 having the reflective cup 221; however, the structure of the light emitting device 200 is not limited thereto. As illustrated in FIGS. 6A and 6B, a light emitting device 200' may have a chip-on-board (COB) structure in which an LED chip 210' is mounted on an upper surface of a body 220'. In this case, the body 220' may be a circuit board with circuit wirings formed thereon, and an encapsulating portion 240' may have a structure of a lens protruding on the upper surface of the body 220' and encapsulating the LED chip 210'.

In addition, according to the exemplary embodiment, the light emitting device 200 is described as a single package; however, the type of the light emitting device 200 is not limited thereto. For example, the light emitting device 200 may be the LED chip 210 itself.

Figure 8:
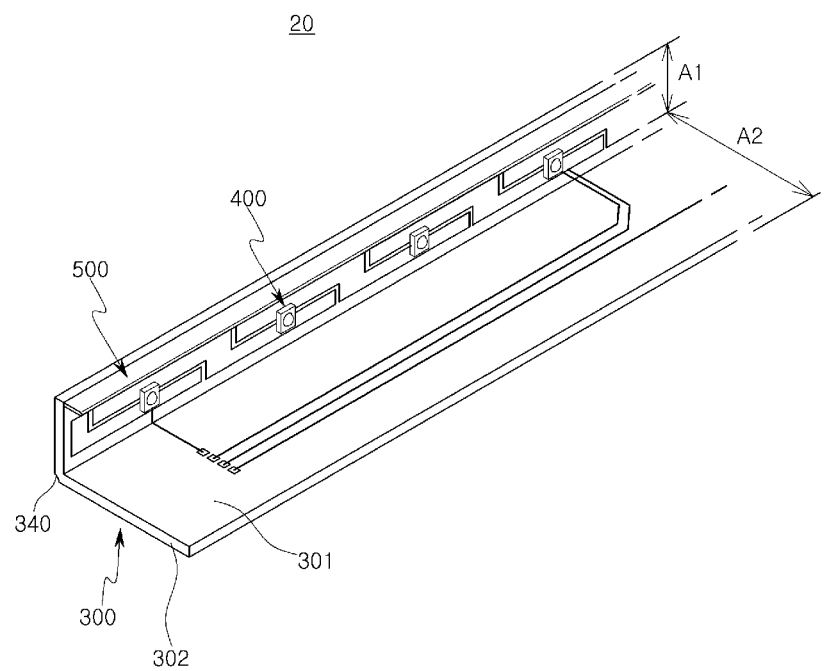
FIG. 8 is a perspective view schematically illustrating alight source module according to another exemplary embodiment in the present disclosure.

Hereinafter, a light source module according to another exemplary embodiment in the present disclosure will be described with reference to FIGS. 8 and 9. FIG. 8 is a perspective view schematically illustrating a light source module according to another exemplary embodiment in the present disclosure, and FIG. 9 is a cross-sectional view of FIG. 8.

Figure 9:
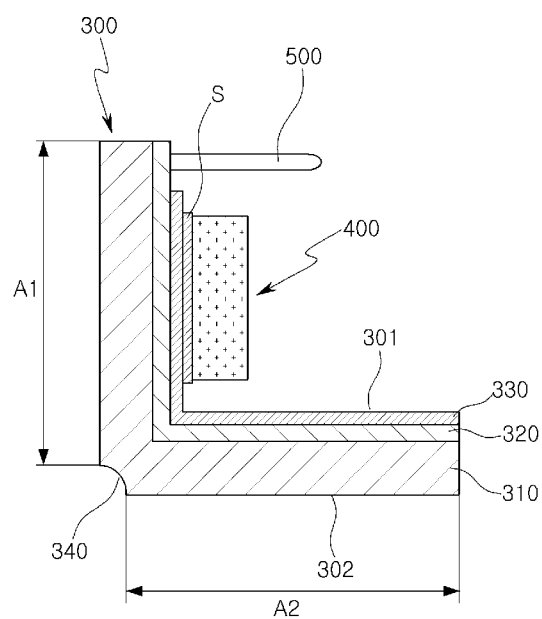
FIG. 9 is a cross-sectional view of FIG. 8.

A light source module 20 according to the exemplary embodiment illustrated in FIGS. 8 and 9 has substantially the same basic structure as the light source module according to the exemplary embodiments illustrated in FIGS. 1 through 6. However, since a structure of a substrate according to the exemplary embodiment illustrated in FIGS. 8 and 9 is different from the structure of the substrate according to the exemplary embodiments illustrated in FIGS. 1 through 6, repeated descriptions will be omitted and the structure of the substrate will be mainly described hereinafter.

Referring to FIGS. 8 and 9, the light source module 20 according to the exemplary embodiment may have a substrate 300, a plurality of light emitting devices 400 mounted on the substrate 300, and a protrusion portion 500 protruding on the substrate 300.

The substrate 300 may have a first surface 301 and a second surface 302 disposed opposite thereto, and may have an "L"-shaped bent structure overall. For example, the substrate 300 may have a pair of sides in parallel in a widthwise direction thereof and a pair of ends in parallel in a lengthwise direction thereof, and may have an "L"-shaped cross section in the widthwise direction thereof.

The first surface 301 may define a top surface of the substrate 300, and the second surface 302 may define a bottom surface of the substrate 300.

As illustrated in FIG. 9, the substrate 300 may have a laminate structure including a metal layer 310, an insulating layer 320 covering the metal layer 310, and a circuit portion 330 provided on the insulating layer 320.

The second surface 302 may be provided with a groove portion 340 formed therein, recessed to a predetermined depth in the direction of the first surface 301. The groove portion 340 may have a structure extending in the lengthwise direction of the substrate 300 to be parallel to both of the sides of the substrate 300 in the widthwise direction. The groove portion 340 may be provided adjacently to one of the sides of the substrate 300 in the widthwise direction.

The circuit portion 330 may be provided on the first surface 301. The circuit portion 330 may electrically connect the plurality of light emitting devices 400 thereto while being mounted on the substrate 300.

The substrate 300 may be divided into a first area A1 and a second area A2 based on the groove portion 340. The first area A1 and the second area A2 may be divided based on the widthwise direction of the substrate 300, and one of the first area A1 and the second area A2 may be larger than the other. The substrate 300 may have a structure in which the first area A1 and the second area A2 are disposed on different planes.

The substrate 300 may have substantially the same configuration and basic structure as those of the substrate 100 according to the exemplary embodiment illustrated in FIG. 1. Accordingly, detailed descriptions of the substrate 300 will be omitted for conciseness.

The plurality of light emitting devices 400 may be mounted on the first surface 301 of the substrate 300 to be electrically connected to the circuit portion 330.

The plurality of light emitting devices 400 may be a photoelectric device generating light having a predetermined wavelength through externally supplied driving power. For example, the plurality of light emitting devices 400 may include a semiconductor LED chip having an n-type semiconductor layer, a p-type semiconductor layer, and an active layer interposed therebetween, or a package including the semiconductor LED chip.

The plurality of light emitting devices 400 may emit blue light, green light, or red light depending on a material contained therein or through a combination thereof with a phosphor, or may emit white light, ultraviolet light, and the like.

The light emitting devices 400 may have substantially the same configuration and basic structure as those of the light emitting devices 200 according to the exemplary embodiment illustrated in FIG. 1. Also, the structure in which the light emitting devices 400 are disposed on the substrate 300 to be connected to the circuit portion 330 is the same as that of the light emitting devices 200. Accordingly, detailed descriptions of the substrate 300 will be omitted.

The protrusion portion 500 may protrude from the first surface 301 while being disposed adjacently to the plurality of light emitting devices 400. As illustrated in FIG. 9, the protrusion portion 500 may be disposed between a side of the substrate 300 in the widthwise direction and the plurality of light emitting devices 400 to extend in the lengthwise direction of the substrate 300.

The protrusion portion 500 extending from the first surface 301 may protrude further than the plurality of light emitting devices 400.

The protrusion portion 500 may be formed of non-conductive material, for example, silicon.

The protrusion portion 500 may protrude from a portion of the insulating layer 320 while perpendicularly extending therefrom. Also, the protrusion portion 500 may be physically attached to the insulating layer 320 using an adhesive, or the like.

Referring to FIGS. 10 through 13, a method of manufacturing a light source module according to an exemplary embodiment in the present disclosure will be described.

FIGS. 10 through 13 are diagrams schematically illustrating sequential operations of a method of manufacturing a light source module according to an exemplary embodiment in the present disclosure.

FIG. 10 illustrates a process of forming the substrate 100 having the laminate structure including the metal layer 110, the insulating layer 120 covering the metal layer 110, and the copper clad layer 130a stacked on the insulating layer 120. For example, the substrate 100 may be formed using an MCCL as a base.

The metal layer 110 may be formed of a metal having relatively high thermal conductivity. For example, such a metal may include a Cu plate or an Al plate. For example, the insulating layer 120 may be formed of a PP or PI based resin.

FIG. 11 illustrates a process of forming the groove portion 140 and the circuit portion 130 on the substrate 100.

The groove portion 140 may be formed by etching the second surface 102 of the substrate 100 corresponding to the bottom surface thereof to a predetermined depth in the lengthwise direction of the substrate 100. The substrate 100 may be divided into the first area A1 and the second area A2 by the groove portion 140.

The circuit portion 130 may be formed by patterning the copper clad layer 130a stacked on the first surface 101 corresponding to the top surface of the substrate 100, that is, the insulating layer 120. For example, the circuit portion 130 may be formed by etching the copper clad layer 130a based on a designed pattern form, and may include the plurality of first electrode pads 131 and second electrode pads 132, and the plurality of circuit wirings 133.

The plurality of first electrode pads 131 and second electrode pads 132 may be arranged in rows in the first area A1 in the lengthwise direction of the substrate 100 to be disposed adjacently to one side of the substrate 100 in the widthwise direction. The plurality of first electrode pads 131 and second electrode pads 132 may be disposed on the substrate 100 in the lengthwise direction thereof in an alternating manner while being spaced apart from one another at predetermined intervals.

A pair of the circuit wirings 133 may have one end connected to an outermost first electrode pad 131 and an outermost second electrode pad 132 disposed at both ends of an array of the plurality of first electrode pads 131 and second electrode pads 132, respectively, and the other ends extending towards the second area A2 to form the connection area 134 in which the connectors provided for a connection to an external power source are installed.

Figure 12:
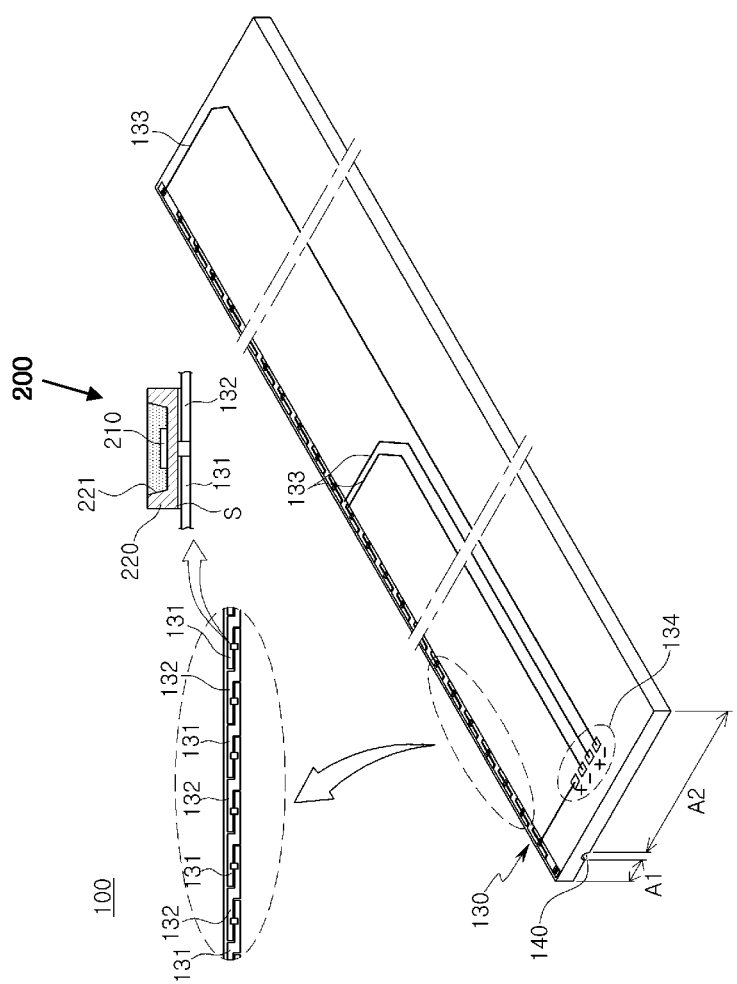

FIG. 12 illustrates a process of mounting the plurality of light emitting devices 200 on the first surface 101 of the substrate 100.

The plurality of light emitting devices 200 may be mounted on the plurality of first electrode pads 131 and second electrode pads 132 so as to be disposed on the substrate 100 in the lengthwise direction thereof. In detail, the plurality of light emitting devices 200 may be electrically connected to the plurality of first electrode pads 131 and second electrode pads 132 through a solder S, and may be disposed corresponding to the array of the plurality of first electrode pads 131 and second electrode pads 132.

Each of the plurality of light emitting devices 200 may have a package structure in which the LED chip 210 installed in the body 220 having the reflective cup 221. In addition, the light emitting device 200 may be mounted on the first surface 101 of the substrate 100 to allow a light emitting surface of the light emitting device 200 to face upwardly to be perpendicular to the first surface 101, thereby providing a top-view type light emitting device.

Figure 13:
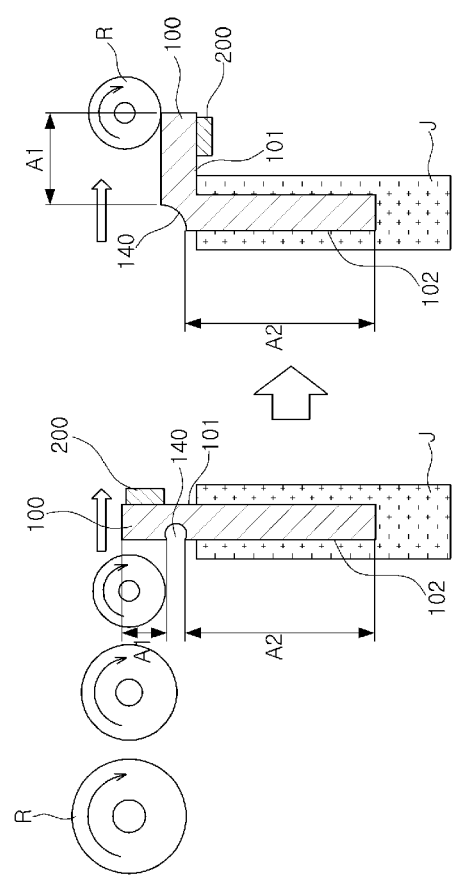

FIG. 13 illustrates a process of bending the substrate 100 in a direction of the first surface 101, such that the first area A1 and the second area A2 are disposed on different planes.

For example, the substrate 100 may be bent in a manner in which the second surface 102 of the first area A1 receives force by a roller R in a direction perpendicular to the second area A2 in a state in which the second area A2 is fixed to a jig J.

During the process of bending the substrate 100 to allow the first area A1 to be perpendicular to the second area A2, the groove portion 140 may mitigate tensile stress applied to the second surface 102, thereby preventing damage to the substrate 100. Accordingly, the groove portion 140 may allow the substrate 100 to be easily bent, and may function as a guide for a reference position of the substrate 100.

The light source module 10 manufactured as described above may provide a side-view type light emitting device by bending the substrate 100 in a state in which the plurality of light emitting devices 200 are mounted on the top surface of the substrate 100 in a top-view type manner. Accordingly, the side-view type light emitting device according to the exemplary embodiment may achieve relatively enhanced heat dissipation efficiency due to an increase in a mounting area of the substrate 100 as compared to a conventional side-view type light emitting device in which the light emitting device is mounted on the substrate in a direction perpendicular to the substrate by using a lateral surface thereof as a mounting surface. Also, the side-view type light emitting device according to the exemplary embodiment may enhance reliability through the use of a stable mounting structure thereof.

Hereinafter, a backlight unit according to an exemplary embodiment in the present disclosure will be described with reference to FIGS. 14 and 15.

Figure 14:
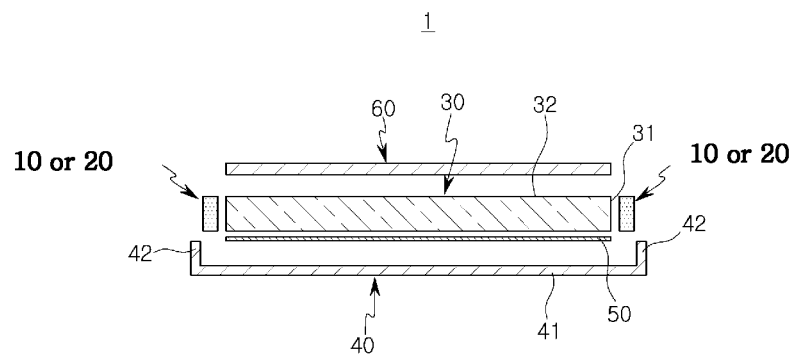
FIG. 14 is a cross-sectional view schematically illustrating a backlight unit according to an exemplary embodiment in the present disclosure.
Figure 15:
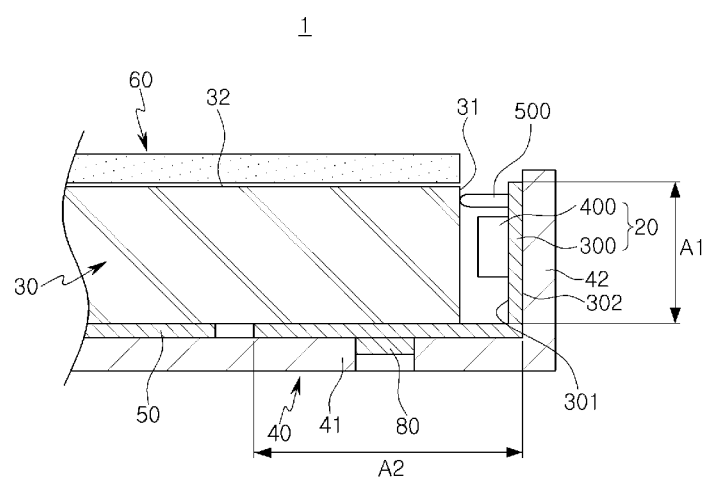
FIG. 15 is an enlarged view of a portion of FIG. 14 schematically illustrating a state in which a light source unit and a light guide panel are disposed on a housing in the backlight unit of FIG. 14.

FIG. 14 is a cross-sectional view schematically illustrating a backlight unit according to an exemplary embodiment in the present disclosure, and FIG. 15 is an enlarged view of a portion of FIG. 14 schematically illustrating a state in which a light source unit and a light guide panel are disposed on a housing in the backlight unit of FIG. 14.

Referring to FIGS. 14 and 15, a backlight unit 1 according to an exemplary embodiment may include the light source modules 10 or 20, a light guide panel 30 to which light of the light source modules 10 or 20 enters to be dissipated externally, and a housing 40 on which the light source modules 10 or 20, and the light guide panel 30 are mounted.

The light source modules 10 or 20 may include the substrates 100 and 300 (shown, for example, in FIGS. 1 through 9), and the plurality of light emitting devices 200 and 400 mounted on the substrates 100 and 300. Since the light source modules 10 or 20 have substantially the same configuration and structure as those of the light source modules 10 or 20 according to the exemplary embodiments illustrated in FIGS. 1 through 9, detailed descriptions pertaining thereto will be omitted for conciseness. Hereinafter, the light source module 20 illustrated in FIGS. 8 and 9 will be mainly described as an example; however, the example of the light source module is not limited thereto.

The light guide panel 30 may have a plate structure provided in a rectangular form having four lateral surfaces, a bottom surface, and a top surface. The light guide panel 30 may be formed of a light transmissive material in order to smoothly induce light of the light source module 20. For example, such a light transmissive material may include polycarbonate (PC), polymethylmethacrylate (PMMA), or acrylic resins.

The light guide panel 30 may be disposed to allow a lateral surface thereof to face the plurality of light emitting devices 400 of the light source module 20. In this instance, the lateral surface of the light guide panel 30 facing the plurality of light emitting devices 400 may define a light incident surface 31, and a top surface of the light guide panel 30 may define a light exit surface 32. Light from the plurality of light emitting devices 400 may travel to an interior of the light guide panel 30 through the light incident surface 31, and may be externally dissipated through the light exit surface 32.

The housing 40 may be a frame member accommodating the light source module 20 and the light guide panel 30 therein to be supported thereby. The housing 40 may have a box-type structure including a bottom surface 41 and a sidewall 42 connected to edges of the bottom surface 41 to extend upwardly, of which the top is open in an upward direction thereof.

The housing 40 may be formed of a rigid metal material in consideration of strength, heat radiating efficiency, and the like; however, the type of material forming the housing 40 is not limited thereto.

The light source module 20 and the light guide panel 30 may be accommodated in a space formed by the bottom surface 41 and the sidewall 42 of the housing 40.

The light source module 20 may have a structure in which the first surface 301 of the first area A1 of the substrate 300 faces the light incident surface 31 of the light guide panel 30, and the first surface 301 of the second area A2 faces the bottom surface of the light guide panel 30 so as to allow the plurality of light emitting devices 400 to face the light incident surface 31 among the lateral surfaces of the light guide panel 30.

The light source module 20 may have a structure in which the second surface 302 of the first area A1 of the substrate 300 is in contact with the sidewall 42, and the second surface 302 of the second area A2 of the substrate 300 is in contact with the bottom surface 41 of the light guide panel 30. In other words, the entirety of the second surface 302 corresponding to the bottom surface of the substrate 300 may be in contact with the housing 40. Accordingly, heat generated from the plurality of light emitting devices 400 may be directly transferred to the housing 40 through the first area A1 and the second area A2 of the substrate 100 so as to enhance heat radiating efficiency.

On the other hand, an end of the protrusion portion 500 provided with the light source module 20 may be in contact with the light incident surface 31 of the light guide panel 30. The light guide panel 30 may be spaced apart from the light emitting device 400 by the protrusion portion 500 disposed therebetween. That is, the protrusion portion 500 may protrude further than the plurality of light emitting devices 400, thereby preventing contact between the light guide panel 30 and the plurality of light emitting devices 400. Accordingly, damage to the light emitting device 400 caused by a collision thereof with the light guide panel 30 may be prevented during a process of mounting the light guide panel 30 on the housing 40.

Also, the protrusion portion 500 may function as a reflective surface obscuring upper portions of the plurality of light emitting devices 400 as well as function as a spacer maintaining an interval between the light guide panel 30 and the plurality of light emitting devices 400. As illustrated in FIGS. 14 and 15, in a case in which a portion of light generated in the plurality of light emitting devices 400 does not enter the light incident surface 31 of the light guide panel 30, the portion of light may be reflected by the protrusion portion 500 so as to enter the light incident surface 31. Accordingly, light emission efficiency of the light emitting device 400 may be enhanced by using the light guide panel 30.

The backlight unit 1 may further include a connector 80 connected to the light source module 20 to supply driving power thereto. The connector 80 may be connected to a circuit wiring provided with the substrate 300 of the light source module 20.

According to the exemplary embodiment, the connector 80 may be provided below the substrate 300; however, the position of the connector 80 with respect to the substrate 300 is not limited thereto.

The light guide panel 30 may have a reflective sheet 50 below the bottom surface thereof and an optical sheet 60 on a top surface thereof. The reflective sheet 50 may reflect light incident on an interior of the light guide panel 30 through the light incident surface 31 towards the top surface of the light guide panel 30. The optical sheet 60 may diffuse light emitted through the top surface of the light guide panel 30 in several directions, or may function to converge the light inwardly of a front viewing angle. Accordingly, luminance of a display device in which the backlight unit 1 is installed may be enhanced.

Likewise, the backlight unit according to the exemplary embodiment may enhance heat radiation efficiency thereof by providing the structure in which the substrate constituting the light source module has the bent structure, such that the entirety of the structure may be in contact with the housing. Also, the connector may be provided on the bottom surface of the housing rather than the lateral surface of the housing, through the structure in which the circuit wiring electrically connected to the light emitting device extends along the bottom surface of the housing, and thus a light path may not be affected thereby. As a result, a quality of light characteristics of the backlight unit may be enhanced.

In addition, a bezel area of the display device occupied by the sidewall of the housing may be minimized, and thus a size of a screen of the display device may be increased.

As set forth above, according to exemplary embodiments in the present disclosure, a light source module and a backlight unit having the same may be provided to improve heat radiation efficiency thereof and enhance reliability through the use of stable mounting structures of the light source module and the backlight unit.

Various advantages and effects in exemplary embodiments in the present disclosure are not limited to the above-described descriptions and may be easily understood through explanations of concrete embodiments in the present disclosure.

While exemplary embodiments have been shown and described above, it will be apparent to those skilled in the art that modifications and variations could be made without departing from the scope of the present invention as defined by the appended claims.

What is claimed is:

1. A light source module, comprising:
   a substrate including a conductive circuit layer at a first surface of the substrate, a metal layer at a second surface of the substrate opposite to the first surface, and an insulating layer disposed between the conductive circuit layer and the metal layer; and
   a plurality of light emitting devices mounted on the first surface and electrically connected to the conductive circuit layer,
   wherein the substrate is provided with a groove in the second surface thereof that does not extend through the substrate, the groove extending lengthwise across the substrate from a first side of the substrate to second side of the substrate,
   wherein the substrate is divided into a first area and a second area that are separated by the groove and wherein the substrate is bent about the groove, and
   wherein the conductive circuit layer comprises a first wiring including a first portion that extends from one of the first side and second side in the lengthwise direction to a central portion of the substrate and a second portion that extends from the first portion of the first wiring across the groove to connect to a corresponding one of the plurality of light emitting devices.

2. The light source module of claim 1, wherein the groove extends in a lengthwise direction of the substrate and is parallel to opposite sides of the substrate.

3. The light source module of claim 1, wherein the first area is perpendicular to the second area.

4. The light source module of claim 1, wherein the plurality of light emitting devices are disposed on the substrate along a lengthwise direction of the substrate.

5. The light source module of claim 1, wherein the conductive circuit layer includes:
   a plurality of pairs of first electrode pads and second electrode pads disposed along a lengthwise direction of the substrate extending between the first side of the substrate and the second side of the substrate opposite of the first side of the substrate,
   connectors provided at the first side of the substrate and at the second side of the substrate, and
   a plurality of pairs of circuit wirings, each pair of circuit wirings electrically connecting a corresponding first electrode pad and second electrode pad pair and a corresponding one of the connectors.

6. The light source module of claim 1, wherein the conductive circuit layer comprises a copper clad layer.

7. The light source module of claim 1, wherein the insulating layer is formed of a polypropylene (PP) or polyimide (PI) based resin.

8. The light source module of claim 1, further comprising:
   a non-conductive protrusion, adjacent to the plurality of light emitting devices, protruding from the insulative layer of the substrate past the plurality of light emitting devices.

9. The light source module of claim 1, wherein the groove does not extend through the metal layer of the substrate.

10. The light source module of claim 1, further comprising a connector connected to the substrate, wherein the first portion of the first wiring includes an end terminating at and electrically connected to the connector.

11. The light source module of claim 5, wherein the plurality of pairs of first electrode pads and second electrode pads are disposed in the lengthwise direction thereof in an alternating manner while being spaced apart from one another at predetermined intervals.

12. A backlight unit, comprising:
    a light source module including:
      a substrate including a conductive circuit layer at a first surface of the substrate, a metal layer at a second surface of the substrate opposite the first surface, and an insulating layer disposed between the conductive circuit layer and the metal layer, and a plurality of light emitting devices mounted on the first surface and electrically connected to the conductive circuit layer, wherein the substrate is provided with a groove in the second surface thereof that does not extend through the substrate, the groove extending lengthwise across the substrate from a first side of the substrate to second side of the substrate, wherein the substrate is divided into a first area and a second area that are separated by the groove and wherein the substrate is bent about the groove, and wherein the conductive circuit layer comprises a first wiring including a first portion that extends from one of the first side and second side in the lengthwise direction to a central portion of the substrate and a second portion that extends from the first portion of the first wiring across the groove to connect to a corresponding one of the plurality of light emitting devices;

a light guide panel positioned to receive and guide light of the light source module; and a housing on which the light source module and the light guide panel are mounted.

13. The backlight unit of claim 12, wherein the first surface of the substrate of the light source module includes a first area and a second area, the plurality of light emitting devices mounted on the first area of the first surface, and wherein the substrate and the light guide panel are positioned such that the first area faces a lateral surface of the light guide panel to allow the plurality of light emitting devices to face the lateral surface of the light guide panel, and the second area faces a bottom surface of the light guide panel.

14. The backlight unit of claim 12, wherein the housing has a bottom surface and a sidewall connected to the bottom surface at the edge of the bottom surface, and the second surface of the substrate of the light source module includes a first area and a second area, and wherein the first area of the second surface of the substrate is in contact with the sidewall, and the second area of the second surface of the substrate is in contact with the bottom surface of housing to thereby provide a heat conductive path to conduct heat generated from the plurality of light emitting devices to the bottom surface of housing through the second area of the second surface of the substrate which is in contact with the bottom surface of housing.

15. The backlight unit of claim 12, wherein the light source module further comprises a non-conductive protrusion, adjacent to the plurality of light emitting devices, protruding from the insulative layer of the substrate past the plurality of light emitting devices, wherein an end of the protrusion portion is in contact with a light incident surface of the light guide panel.

16. The backlight unit of claim 12, wherein the insulating layer comprises a polypropylene (PP) or polyimide (PI) based resin.

17. A display device, comprising the backlight unit of claim 12, and further comprising a reflective sheet positioned below a bottom surface of the light guide panel and an optical sheet positioned on a top surface of the light guide panel, the reflective sheet having a reflective surface to reflect light of the light source module to an interior of the light guide panel towards the top surface of the light guide panel, and the optical sheet converges the light inwardly with respect to a front viewing angle, to enhance luminance of the display device in which the backlight unit is installed.

18. The light source module of claim 12, wherein the groove does not extend through the metal layer of the substrate.

19. The light source module of claim 12, further comprising a connector connected to the substrate, wherein the first portion of the first wiring includes an end terminating at and electrically connected to the connector.

20. The backlight unit of claim 13, wherein the light guide panel is configured to receive light from the light source module through the lateral surface of the light guide panel and to transmit the received light through a top surface of the light guide panel.

* * * * *